United States Patent
Zhu et al.

(10) Patent No.: US 10,807,599 B2
(45) Date of Patent: Oct. 20, 2020

(54) DRIVING SCENARIO BASED LANE GUIDELINES FOR PATH PLANNING OF AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Qi Kong, Sunnyvale, CA (US); Yuchang Pan, Beijing (CN); Fuxiao Xin, Beijing (CN); Hui Jiang, Sunnyvale, CA (US); Li Zhuang, Sunnyvale, CA (US); Weicheng Zhu, Sunnyvale, CA (US); Chunming Zhao, Beijing (CN); Zhenguang Zhu, Beijing (CN); Jingao Wang, Sunnyvale, CA (US); Haoyang Fan, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 162 days.

(21) Appl. No.: 15/560,148

(22) PCT Filed: Sep. 18, 2017

(86) PCT No.: PCT/CN2017/102083
§ 371 (c)(1),
(2) Date: Sep. 20, 2017

(87) PCT Pub. No.: WO2019/051834
PCT Pub. Date: Mar. 21, 2019

(65) Prior Publication Data
US 2019/0084571 A1    Mar. 21, 2019

(51) Int. Cl.
*B60W 30/18* (2012.01)
*G05D 1/00* (2006.01)
(Continued)

(52) U.S. Cl.
CPC ...... *B60W 30/18154* (2013.01); *B60W 10/20* (2013.01); *B60W 30/18163* (2013.01);
(Continued)

(58) Field of Classification Search
CPC ...... G01C 21/005; G01C 21/26; G01C 21/30; G01C 21/34; G01C 21/3415;
(Continued)

(56) References Cited

U.S. PATENT DOCUMENTS 6,246,417 B1 * 6/2001 Kambe ............... G06T 11/60
                                                        345/441
6,834,230 B1 * 12/2004 Childs ............... G01C 21/3626
                                                        701/400
(Continued)

FOREIGN PATENT DOCUMENTS

CN    106327896    1/2017
CN    106444780    2/2017
(Continued)

*Primary Examiner* — Thomas G Black
*Assistant Examiner* — Sara J Lewandroski
(74) *Attorney, Agent, or Firm* — Womble Bond Dickinson (US) LLP

(57) ABSTRACT

In one embodiment, in response to a route from a source location to a target location, the route is analyzed to identify a list of one or more driving scenarios along the route that match one or more predetermined driving scenarios. The route is segmented into a list of route segments based on the driving scenarios. At least one of the route segments corresponds to one of the identified driving scenarios. A path is generated based on the route segments for driving an autonomous driving vehicle from the source location to the (Continued)

target location. The path includes a number of path segments corresponding to the route segments. At least one of the path segments of the path is determined based on a preconfigured path segment of a predetermined driving scenario associated with the path segment, without having to calculating the same at real time.

18 Claims, 11 Drawing Sheets

(51) Int. Cl.
*B60W 10/20* (2006.01)
*G08G 1/0967* (2006.01)
*G08G 1/0968* (2006.01)

(52) U.S. Cl.
CPC ..... *G05D 1/0088* (2013.01); *G08G 1/096725* (2013.01); *G08G 1/096775* (2013.01); *G08G 1/096816* (2013.01); *B60W 2520/10* (2013.01); *B60W 2552/20* (2020.02)

(58) Field of Classification Search
CPC .............. G01C 21/343; G01C 21/3446; G01C 21/3453; G01C 21/3461; G01C 21/3484; G01C 21/3492; G01C 21/3691; G01C 21/3694; G05D 1/0088; B60W 2050/0089; B60W 2530/14
See application file for complete search history.

(56) References Cited

U.S. PATENT DOCUMENTS

| | | | | |
|---|---|---|---|---|
| 7,277,794 | B1* | 10/2007 | Childs | G01C 21/32 701/400 |
| 8,412,667 | B2* | 4/2013 | Zhang | G01S 5/0027 706/54 |
| 9,008,858 | B1* | 4/2015 | Payne | B60H 1/00771 701/1 |
| 9,109,913 | B2* | 8/2015 | Lu | G01C 21/3461 |
| 9,145,116 | B2 | 9/2015 | Clarke | |
| 9,290,108 | B2* | 3/2016 | Payne | B60L 11/1874 |
| 9,709,411 | B2* | 7/2017 | Barth | G01C 21/3658 |
| 9,927,251 | B2* | 3/2018 | Vu | G01C 21/3461 |
| 2002/0111736 | A1* | 8/2002 | Chowanic | G01C 21/3484 701/424 |
| 2006/0030987 | A1* | 2/2006 | Akita | B62D 15/025 701/41 |
| 2006/0155464 | A1* | 7/2006 | Smartt | G01C 21/32 701/450 |
| 2008/0275602 | A1* | 11/2008 | Peake | G05D 1/0212 701/25 |
| 2008/0294331 | A1* | 11/2008 | Fushiki | G08G 1/096827 701/119 |
| 2008/0319645 | A1* | 12/2008 | Kumagai | G01C 21/3484 701/533 |
| 2009/0070035 | A1* | 3/2009 | Van Buer | G01C 21/32 701/450 |
| 2009/0132139 | A1* | 5/2009 | Takeuchi | B60W 30/18009 701/70 |
| 2009/0300067 | A1* | 12/2009 | Denaro | B60W 40/076 |
| 2012/0072107 | A1* | 3/2012 | Okude | G01C 21/343 701/416 |
| 2013/0006473 | A1* | 1/2013 | Buerkle | B62D 1/28 701/41 |
| 2014/0095072 | A1* | 4/2014 | Raab | G01C 21/26 701/537 |
| 2014/0278052 | A1* | 9/2014 | Slavin | G08G 1/0145 701/400 |
| 2015/0142484 | A1* | 5/2015 | Huang | G06Q 10/063 705/7.11 |
| 2016/0033971 | A1 | 2/2016 | Thomson | |
| 2016/0171521 | A1 | 6/2016 | Ramirez et al. | |
| 2016/0171885 | A1 | 6/2016 | Lynch | |
| 2017/0314945 | A1* | 11/2017 | Konig | G01C 21/3415 |
| 2017/0320495 | A1* | 11/2017 | Lu | B60W 50/10 |
| 2018/0011494 | A1* | 1/2018 | Zhu | B60W 10/18 |
| 2018/0024565 | A1* | 1/2018 | Fridman | G01C 21/28 701/26 |
| 2018/0045517 | A1* | 2/2018 | Ahuja | B61L 3/008 |
| 2018/0051997 | A1* | 2/2018 | Grochocki, Jr. | G01C 21/3415 |
| 2018/0094943 | A1* | 4/2018 | Grochocki, Jr. | G01C 21/3415 |
| 2018/0143643 | A1* | 5/2018 | Fairfield | G08G 1/096833 |
| 2018/0216949 | A1* | 8/2018 | Kluge | G08G 1/096816 |
| 2018/0374032 | A1* | 12/2018 | Pan | G01C 21/3461 |
| 2019/0025837 | A1* | 1/2019 | Conor | G05D 1/0274 |
| 2019/0041858 | A1* | 2/2019 | Bortoff | B60W 50/0098 |
| 2019/0049256 | A1* | 2/2019 | Camp | G01C 21/3453 |
| 2020/0122755 | A1* | 4/2020 | Claussen | B61K 11/00 |

FOREIGN PATENT DOCUMENTS

| | | |
|---|---|---|
| CN | 107084735 | 8/2017 |
| WO | 20170136391 | 8/2017 |

* cited by examiner

| Straight Scenario/Path Table 400 | | | | |
|---|---|---|---|---|
| Starting Location 401 | Ending Location 402 | Speed 403 | Lane Width 404 | Path Segment 405 |
| Location 1 | ... | ... | ... | Path segment 1 |
| Location 2 | ... | ... | ... | Path segment 2 |
| Location 3 | ... | ... | ... | Path segment 3 |
| ... | ... | ... | ... | ... |

FIG. 4A

Turning Scenario/Path Table
420

| Starting Location 421 | Ending Location 422 | Speed 423 | Curvature 424 | Path Segment 425 |
|---|---|---|---|---|
| Location 1 | ... | ... | ... | Path segment 1 |
| Location 2 | ... | ... | ... | Path segment 2 |
| Location 3 | ... | ... | ... | Path segment 3 |
| ... | ... | ... | ... | ... |

FIG. 4B

Lane Changing Scenario/Path Table
450

| Starting Location 451 | Ending Location 452 | Speed 453 | Lane Distance 454 | Path Segment 455 |
|---|---|---|---|---|
| Location 1 | ... | ... | ... | Path segment 1 |
| Location 2 | ... | ... | ... | Path segment 2 |
| Location 3 | ... | ... | ... | Path segment 3 |
| ... | ... | ... | ... | ... |

FIG. 4C

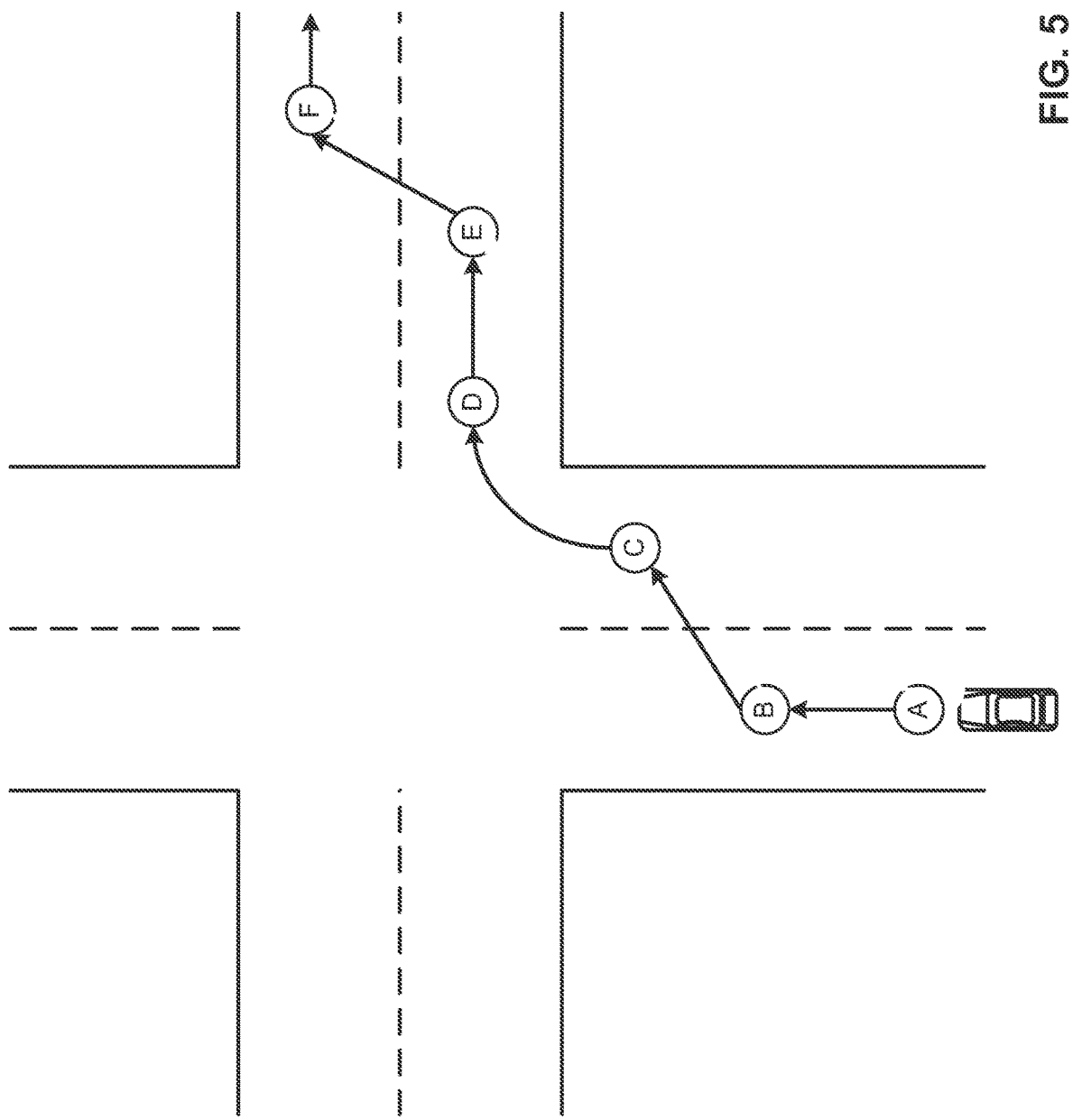

DRIVING SCENARIO BASED LANE GUIDELINES FOR PATH PLANNING OF AUTONOMOUS DRIVING VEHICLES

CROSS-REFERENCE TO RELATED APPLICATION

This patent application is a U.S. National Phase Application under 35 U.S.C. § 371 of International Application No. PCT/CN2017/102083, filed Sep. 18, 2017, entitled "DRIVING SCENARIO BASED LANE GUIDELINES FOR PATH PLANNING OF AUTONOMOUS DRIVING VEHICLES," which is incorporated by reference herein by its entirety.

TECHNICAL FIELD

Embodiments of the present disclosure relate generally to operating autonomous vehicles. More particularly, embodiments of the disclosure relate to driving scenario based lane guideline for path planning of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

In planning a route from a starting location to a destination location, a reference line of the route is important as it is the ultimate goal for a path along which an autonomous driving vehicle is driven. However, a good path guideline could make a much difference compared to an ordinary reference line centered on the road. A typical reference line is determined based on the center line of a particular lane or road, which is obtained from the standard route and map information. However, such a reference line may not be the most optimal reference line. In addition, calculating a path based on a reference line is time consuming at real-time.

SUMMARY

Embodiments of the present disclosure provide a computer-implemented method for path planning of autonomous driving vehicles, a non-transitory machine-readable medium, and a data processing system.

In an aspect of the disclosure, the computer-implemented method for path planning of autonomous driving vehicles comprises: in response to a route for routing an autonomous driving vehicle (ADV) from a source location to a target location, analyzing the route to identify a list of one or more driving scenarios along the route that match one or more predefined driving scenarios; segmenting the route into a plurality of route segments based on the driving scenarios, at least one of the route segments corresponding to one of the identified driving scenarios; and generating a path based on the route segments for driving an autonomous driving vehicle (ADV) from the source location to the target location, the path having a plurality of path segments corresponding to the route segments, wherein at least one of the path segments of the path is determined based on a preconfigured path segment corresponding to a predefined driving scenario.

In another aspect of the disclosure, the non-transitory machine-readable medium has instructions stored therein, which when executed by a processor, cause the processor to perform operations. The operations comprise: in response to a route for routing an autonomous driving vehicle (ADV) from a source location to a target location, analyzing the route to identify a list of one or more driving scenarios along the route that match one or more predefined driving scenarios; segmenting the route into a plurality of route segments based on the driving scenarios, at least one of the route segments corresponding to one of the identified driving scenarios; and generating a path based on the route segments for driving an autonomous driving vehicle (ADV) from the source location to the target location, the path having a plurality of path segments corresponding to the route segments, wherein at least one of the path segments of the path is determined based on a preconfigured path segment corresponding to a predefined driving scenario.

In a further aspect of the disclosure, the data processing system comprises: a processor; and a memory coupled to the processor to store instructions, which when executed by the processor, cause the processor to perform operations, the operations including: in response to a route for routing an autonomous driving vehicle (ADV) from a source location to a target location, analyzing the route to identify a list of one or more driving scenarios along the route that match one or more predefined driving scenarios, segmenting the route into a plurality of route segments based on the driving scenarios, at least one of the route segments corresponding to one of the identified driving scenarios, and generating a path based on the route segments for driving an autonomous driving vehicle (ADV) from the source location to the target location, the path having a plurality of path segments corresponding to the route segments, wherein at least one of the path segments of the path is determined based on a preconfigured path segment corresponding to a predefined driving scenario.

In a further aspect of the disclosure, the computer-implemented method for path planning of autonomous driving vehicles comprises: collecting driving statistics of a plurality of vehicles driving on a plurality of roads with different road configurations; performing an analysis on the driving statistics to identify a list of driving scenarios matching a set of predefined driving scenarios at different locations at different points in time; for each of the driving scenarios, identifying a list of locations at which at least some of the vehicles operated under the same driving scenario, for each of the locations associated with the driving scenario, determining a preferred path segments based on driving statistics associated with the location, and generating a driving scenario to path (scenario/path) data structure for the driving scenario to map specific locations to preferred path segments, wherein the scenario/path data structure is utilized subsequent to plan a path segment of a path at a particular location under a particular driving scenario using a corresponding preferred path segment without having to dynamically calculating the path segment.

BRIEF DESCRIPTION OF THE DRAWINGS

Embodiments of the disclosure are illustrated by way of example and not limitation in the figures of the accompanying drawings in which like references indicate similar elements.

FIGS. 4A-4C are block diagrams illustrating data structures for mapping locations to preferred path segments under certain driving scenarios according to certain embodiments.

FIG. 5 is a block diagram illustrating an example of road and lane configuration which may be utilized with an embodiment.

DETAILED DESCRIPTION

Figure 1:
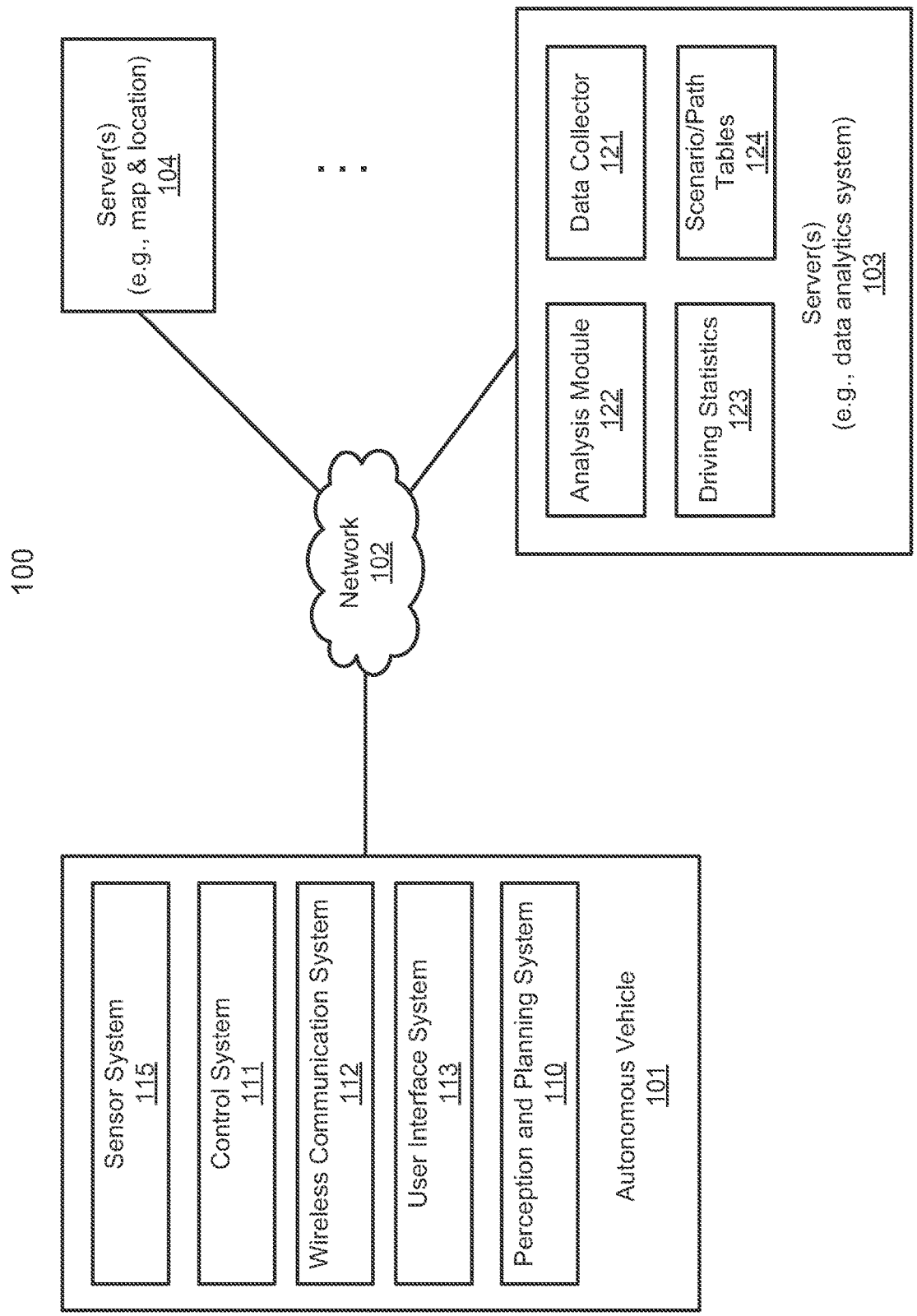
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a behavior-based driving guideline is utilized to guide the path planning of an autonomous driving vehicle (ADV). The behavior-based driving guideline represents a reference line of a lane of a road, which is determined based on driving behaviors of a variety of drivers driving a variety of vehicles in the past under the same or similar driving circumstance (e.g., on the same lane or similar lane of the same or similar road under the same or similar driving condition), either manually or autonomously. A driver behavior based reference line may not match the ordinary center-lined reference line. Rather, the driver behavior-based reference line is determine based on an averaged driver of a large amount of drivers' behaviors under the same or similar driving circumstances. Such behavior-based reference line represents the most optimal reference line that leads to the most comfortable and safe driving of the vehicles amongst most drivers.

According to one aspect, a set of driving scenarios are defined including, but are not limited to, a driving straight scenario, a turning scenario (e.g., left turn, right turn, or U-turn), and a lane changing scenario (e.g., left or right lane changing). For each of the predefined driving scenarios, a list of path segments corresponding to a list of locations are determined based on the driving statistics of a number of vehicles driving through the same or similar path segments in the past. The path segments are then stored in a driving scenario-to-path (scenario/path) data structure specifically configured for the corresponding driving scenario. For example, there will be at least one scenario/path data structure for each of the driving straight scenario, turning scenario, and lane changing scenario.

In one embodiment, a scenario/path data structure includes a number of mapping entries. Each mapping entry maps a particular location of a particular driving scenario to a path segment that a majority of drivers would have driven through from a location within a predetermined proximity of the corresponding location. The path segment represents a preferred or recommended path segment for a specific location of a specific driving scenario. These scenario/path data structures may be created offline based on the past driving statistics of many drivers driving many different types of vehicles at different points in time. Similar to a path, a path segment includes a number of path points along the path segment. Each path point is associated with a location of the path point, a speed of the path point, and a moving direction of the path point, etc. These scenario/path data structures can then be uploaded onto the autonomous driving vehicles and utilized subsequently for generating a path under the similar driving scenarios without having to dynamically calculating the same path segments at real time. As a result, the path planning can be performed more efficiently.

According to another aspect, in response to a route for routing an autonomous driving vehicle from a source location to a target location, the route is analyzed to identify a list of one or more driving scenarios along the route that match one or more predefined or predetermined driving scenarios. The route is segmented into a list of route segments based on the driving scenarios. At least one of the route segments corresponds to one of the identified driving scenarios. A path (e.g., a trajectory) is generated based on the route segments for driving the autonomous driving vehicle from the source location to the target location. The path includes a number of path segments corresponding to the route segments. At least one of the path segments of the path is determined based on a preconfigured path segment of a predefined driving scenario associated with the path segment.

In generating a path, in one embodiment, for each of the route segments matching one of the predefined driving scenarios, a preconfigured path segment is identified based on the matching driving scenario. A corresponding path segment of the path is replaced by the corresponding preconfigured path segment without having to dynamically calculating the same path segment. For those route segments whose driving scenarios do not match with any of the predefined driving scenarios associated with the preconfigured path segments, the path segments for the unmatched route segments are dynamically calculated, for example, based on the standard reference line obtained from the corresponding route segments.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
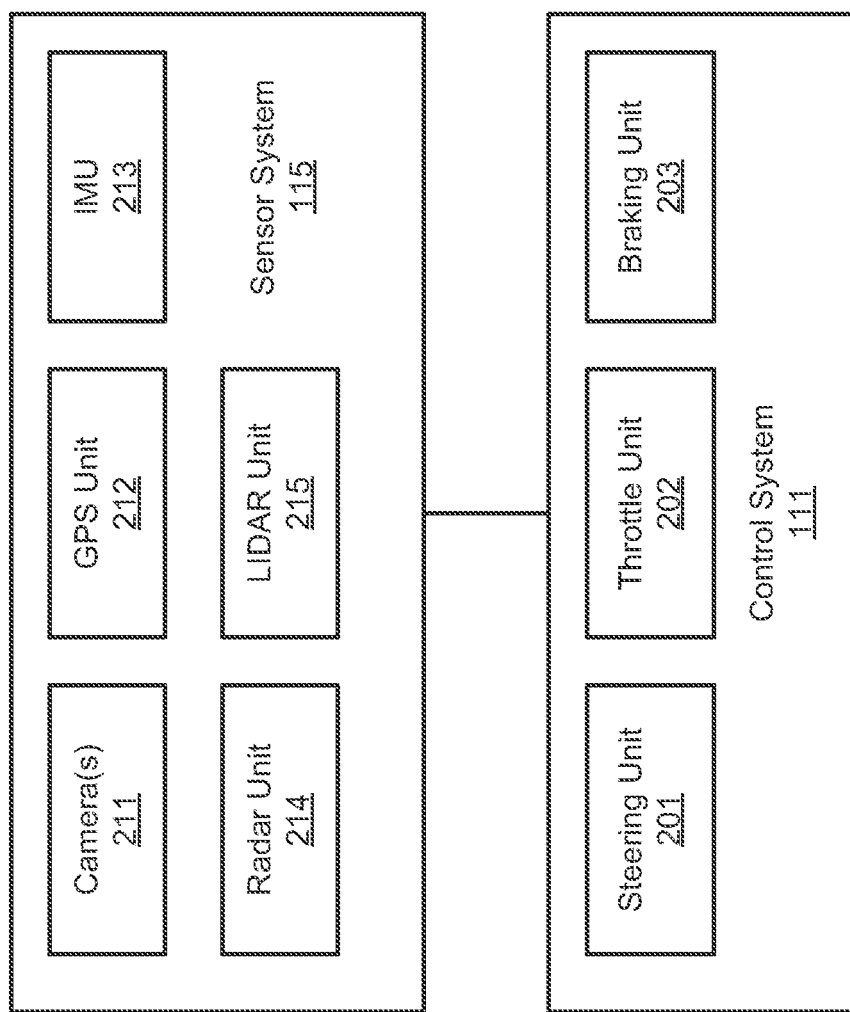
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and data analysis module 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, analysis module 122, which may be implemented as a part of a machine-learning engine or module, analyzes driving statistics 123 and generates a set of scenario/path data structures 124. Data structures 124 can be implemented in a variety of formats such as tables, databases, or predictive models, etc. For the purpose of illustration, a table is utilized as an example of a data structure throughout this application. In one embodiment, each of scenario/path tables 124 is associated with one of a set of predefined driving scenarios, such as, for example, a driving straight scenario, a turning scenario, and a lane changing scenario. A turning scenario may further include a left-turning scenario, a right-turning scenario, and a U-turning scenario. A lane changing scenario may further include a left lane changing scenario and a right lane changing scenario. A driving scenario is also referred to as a driving intention, which represents an intention to drive a vehicle in a particular way such as driving straight, making a turn, or changing lane, etc.

For each of the predefined driving scenarios, analysis module 122 determines a list of path segments corresponding to a list of locations based on the driving statistics 123 of a number of vehicles driving through the same or similar path segments in the past. The path segments are then stored in a driving scenario-to-path (scenario/path) data structure specifically configured for the corresponding driving scenario. For example, there will be at least one scenario/path data structure in scenario/path tables 124 for each of the driving straight scenario, turning scenario, and lane changing scenario. In one embodiment, scenario/path tables 124 includes at least a straight scenario/path table, a left-turn scenario/path table, a right-turn scenario/path table, a U-turn scenario/path table, a left lane changing scenario/path table, and a right lane changing scenario/path table.

In one embodiment, a scenario/path table includes a number of mapping entries. Each mapping entry maps a particular location of a particular driving scenario to a path segment that a majority of drivers would have driven through from a location within a predetermined proximity of the corresponding mapped location. The path segment represents a preferred or recommended path segment for a specific location of a specific driving scenario. These scenario/path tables may be created by analysis module 122 based on the past driving statistics 123 of many drivers driving many different types of vehicles at different points in time. Note that for a given location, there may be more than one driving scenarios. For example, from a given location, some vehicles can move straight, make a turn, or change lane. Thus, there may be multiple scenario/path tables that include an entry corresponding to the same location. However, their path segments would be different because they are associated with different driving scenarios or driver intentions, which may be different at different points in time.

In one embodiment, for a given location of a given driving scenario, the drivers' behaviors of all drivers are determined based on the corresponding driving statistics data obtained from driving statistics 123. For example, for a first location of a left-turn driving scenario, all of the driving behaviors of drivers who made the left turn from a location within a predetermined proximity of the first location are identified from driving statistics 123. Different path segments of different drivers who made the left turn from the proximity of the first location are analyzed to develop a preferred path segment (also referred to as a recommended or most optimal path segment) that summaries all of the driving behaviors of the drivers. For example, a preferred path segment can be determined by taking an average of different path segments performed by different drivers. The preferred path segment is then stored in an entry of the corresponding driving scenario/path table (e.g., the left-turn scenario/path table) associated with the first location. Thus, a preferred path segment of a particular location under a particular driving scenario is determined based on driver behaviors of many drivers within a predetermined proximity of that particular location and driving under the same or similar driving scenario in the history, which represents the path segment preferred by most of the drivers.

An example of a straight scenario/path table is shown in FIG. 4A according to one embodiment. Referring to FIG. 4A, straight driving scenario/path table 400 includes a number of entries. Each entry maps a set of driving parameters 401-404 to a preferred or recommended path segment 405. The driving parameters include starting location 401, ending location 402, vehicle speed 403, and lane width 404. Start location 401 and ending location 402 refer to a geographic location (x, y) of a starting point and ending point of a path segment, which may be determined based on GPS data. Any one or more of driving parameters 401-404 can be utilized as an index to search a particular preferred path segment. In one embodiment, starting location 401 is utilized as a primary index, while one or more of the rest of driving parameters 402-404 may be utilized as a secondary or optional index for searching path segments 405. Alternatively, starting location 401 and speed 403 are utilized as a primary index for searching purpose, while one or more of ending location 402 and lane width 404 may be utilized as a secondary or optional index. For example, if there are more than one entry whose primary indexes (e.g., starting locations 401) are close to each other, a secondary index (e.g., ending location 402, speed, 403, and/or lane width 404) may be used as a tie breaker to determine which of the competing entries should be selected.

During the real-time driving, when a vehicle is at a specific location and it is determined that the vehicle will move straight forward, the current location of the vehicle is utilized to search for an entry having starting location 401 matching the current location of the vehicle. Once the matching entry is found from straight driving scenario/path table 400, the corresponding preferred path segment 405 is obtained from the matching entry. The preferred path segment is then utilized as the path segment as a part of the final path for path planning, without having to dynamically calculate that particular path segment at the point in time. As a result, the resources and time for calculating the same path segment can be reduced. However, if there is no matching entry found from scenario/path table 400, the path segment has to be dynamically calculated at real time. Note that the term of "matching" or "matched" refers to the comparison situation in which values of two items being compared (e.g., location, speed, lane width, curvature) are within a predetermined threshold corresponding to the type of the compared items.

An example of a turning scenario/path table (e.g., left-turn, right-turn, U-turn) is shown in FIG. 4B according to one embodiment. Referring to FIG. 4B, turning scenario/path table 420 can represent a left-turn scenario/path table, a right turn scenario/path table, or a U-turn scenario/path table. In one embodiment, turning scenario/path table 420 includes a number of entries. Each entry maps a set of driving parameters 421-424 to a preferred path segment 425. Driving parameters include starting location 421, ending location 422, speed 423, and curvature 424. Starting location 421 may be utilized as a primary index, while any one or more of driving parameters 422-424 may be utilized as a secondary index for searching purposes. Alternatively, starting location 421 and speed 423 may be utilized as a primary index while one or more of ending location 422 and curvature 424 may be utilized as a secondary or optional index for searching a matched entry.

An example of a lane changing scenario/path table (e.g., left lane changing, right lane changing) is shown in FIG. 4C according to one embodiment. Referring to FIG. 4C, lane changing scenario/path table 450 can represent a left lane changing scenario/path table or a right lane changing scenario/path table. In one embodiment, lane changing scenario/path table 450 includes a number of entries. Each entry maps a set of driving parameters 451-454 to a preferred path segment 455. The driving parameters include starting location 451, ending location 452, speed 453, and lane distance 454. Lane distance 454 refers to a distance between a source lane (e.g., a lane from which a vehicle is about to exit) and a target lane (e.g., a lane to which a vehicle is about to enter). Starting location 451 may be utilized as a primary index for searching purposes, while any one or more of the rest of driving parameters 452-454 may be utilized as a secondary index. Alternatively, starting location 451 and/or speed 453 may be utilized as a primary index, while one or more of ending location 452 and lane distance 454 may be utilized as a secondary or optional index for searching preferred path segment 455.

Note that the indexes for searching purposes can be implemented as a hash function or model, which may be generated using machine learning methods. At real time, the driving parameters at the point in time can be gathered and a hash can be generated using a corresponding hash function. The output of the hash function may be used as an index value pointing to one of the entries in the scenario/path table as a matching entry. Referring back to FIG. 1, these scenario/path tables 124 can then be uploaded onto the autonomous driving vehicles and utilized subsequently for generating a path under the similar driving scenarios without having to dynamically calculating the same path segments. As a result, the path planning can be performed more efficiently.

Figure 3A:
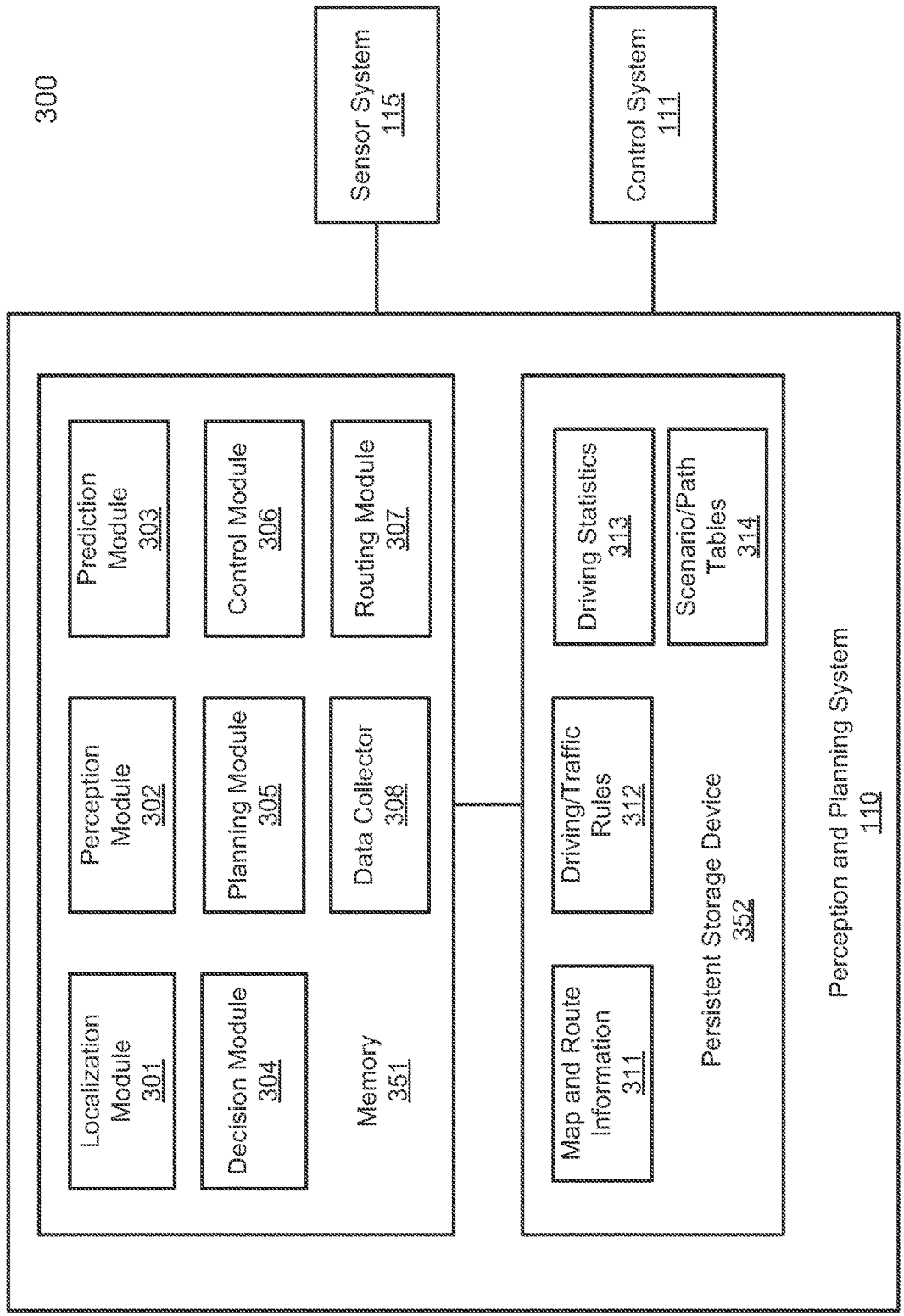
FIGS. 3A-3B are block diagrams illustrating an example of a perception and planning system used with an autonomous vehicle according to one embodiment.
Figure 3B:
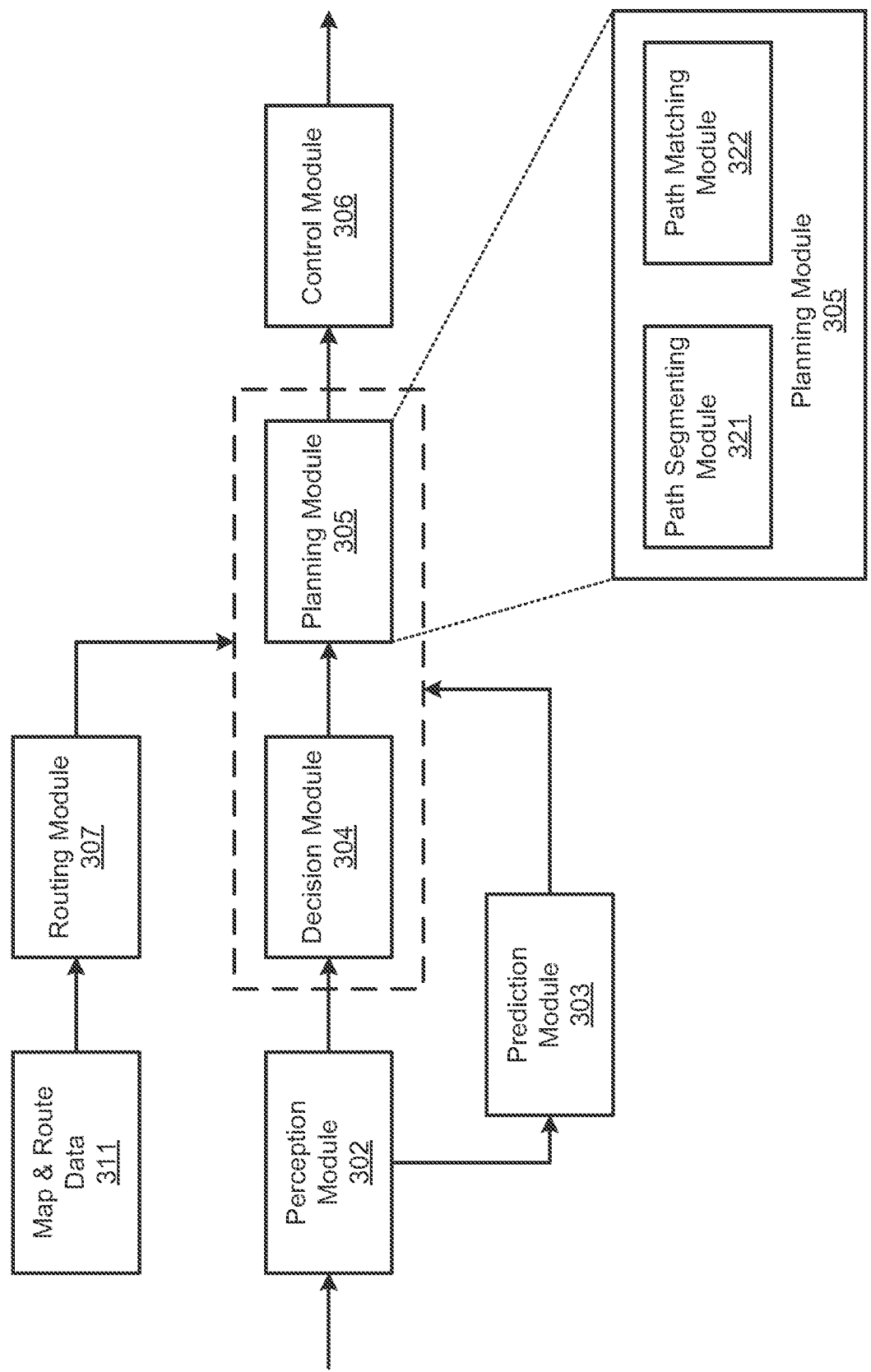

FIGS. 3A and 3B are block diagrams illustrating an example of a perception and planning system used with an autonomous vehicle according to one embodiment. System 300 may be implemented as a part of autonomous vehicle 101 of FIG. 1 including, but not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and data collection module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Data collection module 308 is configured to communicate with other modules and sensors to collect driving statistics 313 during the operations of the ADV. Periodically, driving statistics 313 is then transmitted to a centralized server such as data analytics system 103 for data analysis and mining, for example, to develop scenario/path tables 124 offline using machine learning.

According to one embodiment, planning module 305 includes a path segmenting module 321 and a path matching module 322. In response to a route received from routing module 307, path segmenting module 321 parses and analyzes the route to identify a list of one or more driving scenarios along the route that match one or more predefined driving scenarios. The route may be represented by a reference line connecting a source location to a target location. Path segmenting module 321 may examine the metadata of the reference line (e.g., shape and length) to identify all possible path segments that have the characteristics of preconfigured preferred path segments. Based on the identified driving scenarios, path segmenting module 321 segments the route into a list of one or more route segments, where each route segment corresponds to one of the driving scenarios. As described above, a driving scenario may be a driving straight scenario, a left-turn scenario, a right-turn scenario, a U-turn scenario, a left lane changing scenario, and/or a right lane changing scenario. Other driving scenarios may also be applicable. For example, a combo driving scenario may be defined based on multiple individual driving scenarios above.

In one embodiment, for each of the route segments, path matching module 322 identifies a scenario/path table corresponding to a driving scenario or type of the path segment. For example, if the path segment is a left-turn path segment, path matching module 322 will identify and retrieve a left-turn scenario/path table such as scenario/path table 420 as shown in FIG. 4B. Once the associated scenario/path table has been identified, path matching module 322 searches in the scenario/path table based on at least a starting location of the path segment to locate an entry that matches the at least starting location of the path segment. A preferred path segment is then obtained from the matching entry. The preferred path segment is utilized as a part of the final path for driving an ADV. For example, the preferred path segment may replace the corresponding route segment provided by routing module 307. As a result, planning module 305 does not have to dynamically calculate the corresponding path segment at the point in time, which may be time and resource consuming.

Note that some of the route segments may not have the corresponding preferred path segments found in the associated scenario/path table. For example, a starting location of a path segment may not match any of the starting locations in the scenarios/path table. In such a situation, planning module 305 has to calculating the corresponding path segment dynamically. But for at least the route segments having the matched preferred path segments, the calculation of the corresponding path segments can be avoided to reduce the time and resources consumption during real-time driving.

For the purpose of illustration, referring now to FIG. 5, it is assumed the ADV is about to drive according to a route from point A to point F provided by routing module 307. The route from A to F may be represented by a reference line in a form of a topographic map determined based on route and map data services. Based on the metadata or attributes of route A to F, path segmenting module 321 identifies one or more driving scenarios along the route. Path segmenting module 321 then segments the route into one or more route segments. In this example, path segmenting module 321 identifies and segments the route A to F into at least the following route segments: 1) route segment from A to B (AB) associated with a straight scenario, 2) route segment from B to C (BC) associated with a right lane changing scenario, 3) route segment from C to D (CD) associated with a right-turn scenario, 4) route segment from D to E (DE) associated with a straight scenario, and route segment from E to F (EF) associated with a left lane changing scenario.

For each of the route segments (AB, BC, CD, DE, and EF), path matching module 322 identifies a scenario/path table corresponding to a driving scenario of the route segment. Path matching module 322 then searches in the scenario/path table attempting to find a mapping entry that matches at least some of the attributes of the route segment. If a matching entry is found, a preferred path is obtained from the matching entry, where the preferred path segment will be utilized as a part of the final path for drive the ADV without having to calculate the same at real time.

For example, according to one embodiment, referring to FIGS. 4A and 5, for route segment AB associated with a straight driving scenario, path matching module 322 identifies and searches straight scenario/path table 400 based on the location of point A as a starting location of route segment AB to locate an entry having starting location field 401 that is within a predetermined proximity of the location of point A based on the GPS data, or vice versa. If there are multiple entries that match the location of point A, the speed of point A may be utilized to match speed field 403 of straight scenario/path table 400. The speed of point A matches the speed obtained from field 403 if the difference between these two speed values is less than a predetermined threshold. Other attributes such as the ending location of route segment AB (e.g., location of point B) and the lane width of the current lane can be used to match fields 402 and 404 respectively if there is a need. Once a matching entry has been found, preferred path segment 405 can be obtained from the matching entry. The preferred path segment 405 can be utilized as a path segment of the final path, for example, by replacing the corresponding route segment AB, without having to calculating the same dynamically at the point in time.

In another example according to another embodiment, referring to FIGS. 4C and 5, for route segment BC associated with a right lane changing scenario, path matching module 322 identifies and searches lane changing scenario/path table 450 (assuming in this example a right lane changing scenario/path table) based on the location of point B as a starting location of route segment BC based on GPS data to find an entry having starting location field 451 that is within a predetermined proximity of the location of point B, or vice versa. If there are multiple entries that match the location of point B, the speed of point B may be utilized to match speed field 453 of scenario/path table 450. The speed of point B matches the speed obtained from field 453 if the difference between these two speed values is less than a predetermined threshold. Other attributes such as the ending location of route segment BC (e.g., location of point C) and the lane distance between two lanes involved in the lane changing of the route segment BC can be used to match fields 452 and 454 respectively if there is a need. A lane distance between two lanes refers to the distance between the center line of a source (e.g., a lane from which the vehicle is about to leave) lane and the center line of a target lane (e.g., a lane to which the vehicle is about to enter). Once a matching entry has been found, preferred path segment 455 can be obtained from the matching entry. The preferred path segment 455 can be utilized as a path segment of the final path, for example, by replacing the corresponding route segment BC, without having to calculating the same dynamically at the point in time.

In a further example according to yet another embodiment, referring to FIGS. 4B and 5, for route segment CD associated with a right turn scenario, path matching module 322 identifies and searches turn scenario/path table 420 (assuming in this example a right lane changing scenario/path table) based on the location of point C as a starting location of route segment CD to find an entry having starting location field 421 that is within a predetermined proximity of the location of point C based on GPS data, or vice versa. If there are multiple entries that match the location of point C, the speed of point C may be utilized to match speed field 423 of scenario/path table 420. The speed of point C matches the speed obtained from field 423 if the difference between these two speed values is less than a predetermined threshold. Other attributes such as the ending location of route segment CD (e.g., location of point D) and the curvature of the route segment CD can be used to match fields 422 and 424 respectively if there is a need. Once a matching entry has been found, preferred path segment 425 can be obtained from the matching entry. The preferred path segment 425 can be utilized as a path segment of the final path, for example, by replacing the corresponding route segment BC, without having to calculating the same dynamically at the point in time.

Figure 6:
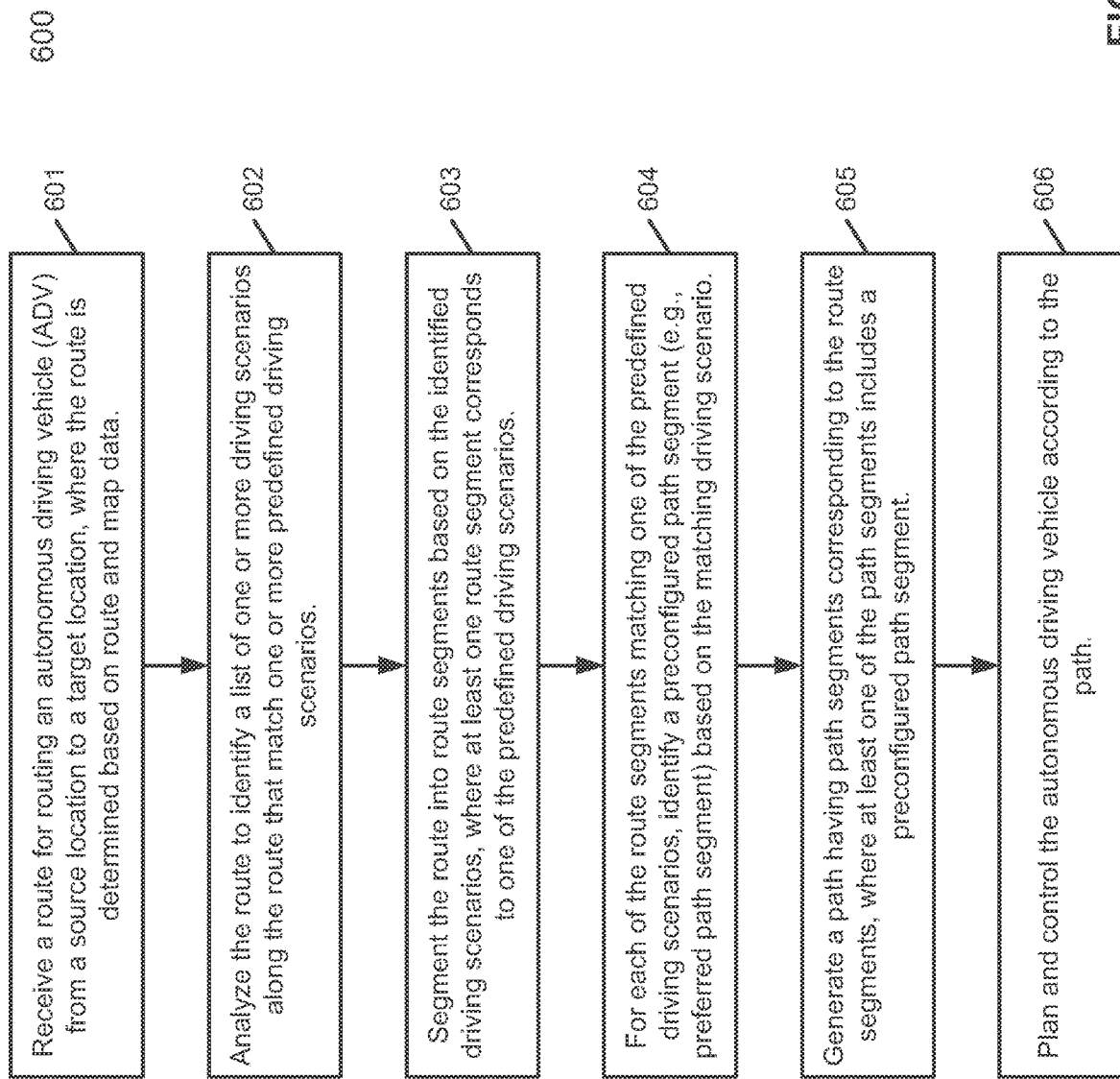
FIG. 6 is a flow diagram illustrating a process of generating a path for routing an autonomous driving vehicle according to one embodiment.

FIG. 6 is a flow diagram illustrating a process of determining a path for driving an autonomous driving vehicle according to one embodiment. Process 600 may be performed by processing logic which may include software, hardware, or a combination thereof. For example, process 600 may be performed by system 300 of FIGS. 3A and 3B. Referring to FIG. 6, in operation 601, processing logic receives a route for routing an ADV from a source location to a target location, which is generated based on route and map data. In operation 602, processing logic parses and analyzes the route to identify a list of one or more driving scenarios that match one or more predefined or predetermined driving scenarios, such as, for example, a straight scenario, a left/right/U turn scenario, and a left/right lane changing scenario. In operation 603, processing logic segments the route into route segments based on the identified driving scenarios, where at least one of the route segments corresponds to one of the predetermined driving scenarios.

In operation 604, for each of the route segments matching one of the predefined driving scenarios, processing logic identifies a preconfigured path segment based on the matching driving scenario. In one embodiment, for each of the route segments, processing logic identifies a scenario/path data structure corresponding to the matching driving scenario. Processing logic then searches the scenario/path data structure based on at least some of the attributes (e.g., starting location and/or speed) of the route segment to locate a matching entry. A preferred path segment is then obtained from the matching entry without having to calculating the same. In operation 605, processing logic generates a path having a number of path segments corresponding to the route segments. At least one of the path segments is determined based on a preconfigured path segment (e.g., preferred or recommended path segment) of a predefined driving scenario, without having to calculating the same path segment dynamically at the point in time. In operation 606, processing logic plans and controls an autonomous driving vehicle according to the path.

Figure 7:
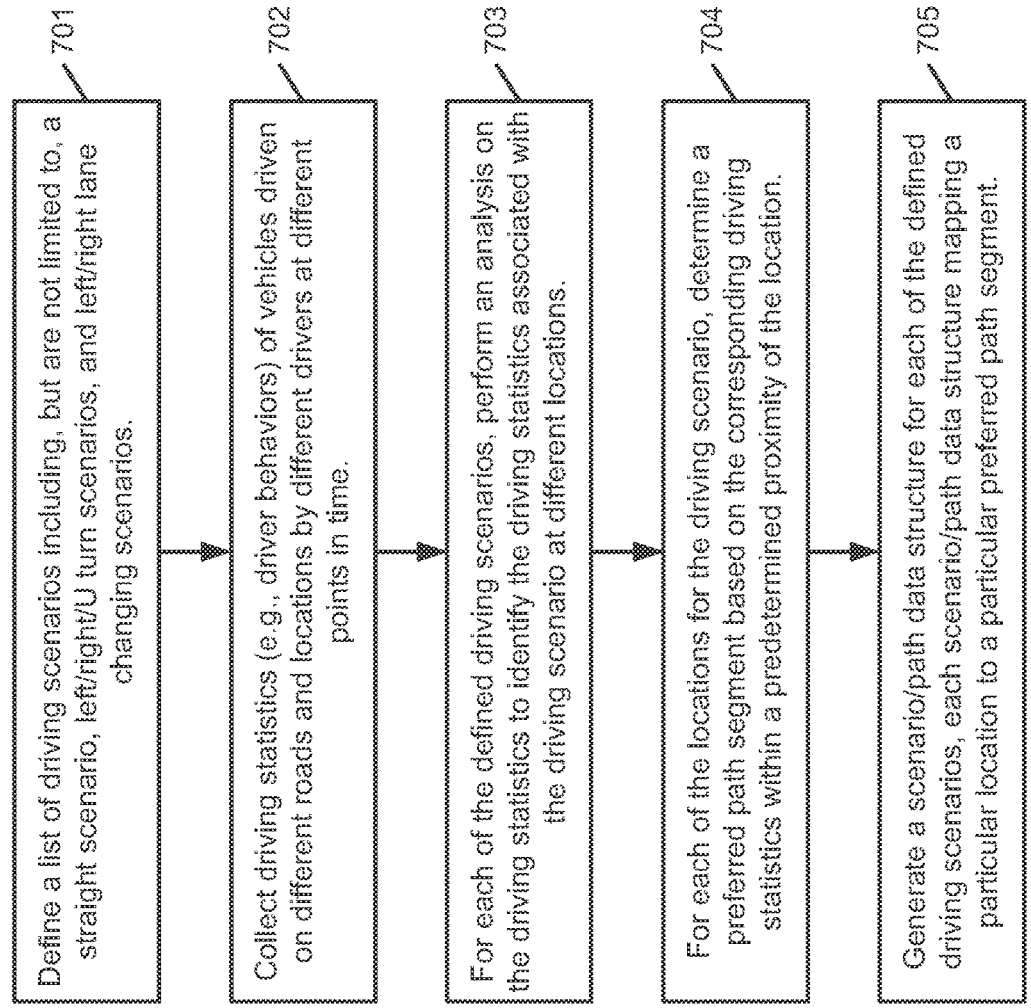
FIG. 7 is a flow diagram illustrating a process of creating driving scenario to path mapping data structures according to one embodiment.

FIG. 7 is a flow diagram illustrating a process of generating scenario to path mapping data structures according to one embodiment. Process 700 may be performed by processing logic which may include software, hardware, or a combination thereof. For example, process 700 may be performed by data analytics system 103 of FIG. 1. Referring to FIG. 7, in operation 701, processing logic defines a list of driving scenarios including, but are not limited to, a straight scenario, left/right/U turn scenarios, and left/right lane changing scenarios. In operation 702, processing logic collects driving statistics (e.g., driving behaviors) of a large amount of vehicles driven a variety of different drivers on different roads and locations at different points in time. For each of the defined driving scenarios, in operation 703, processing logic performs an analysis on the driving statistics to identify the driving statistics or driving behaviors associated with the driving scenario at different locations or roads. For each of the locations of each driving scenario, in operation 704, processing logic determines a preferred path segment based on the driving statistics or driving behaviors of different drivers driving within a proximity of the location. In operation 705, processing logic generates a scenario/path data structure for each of the defined driving scenarios to map a particular location to a preferred path segment that is determined based on the driving statistics or driving behaviors of different drivers under the same or similar driving scenario.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
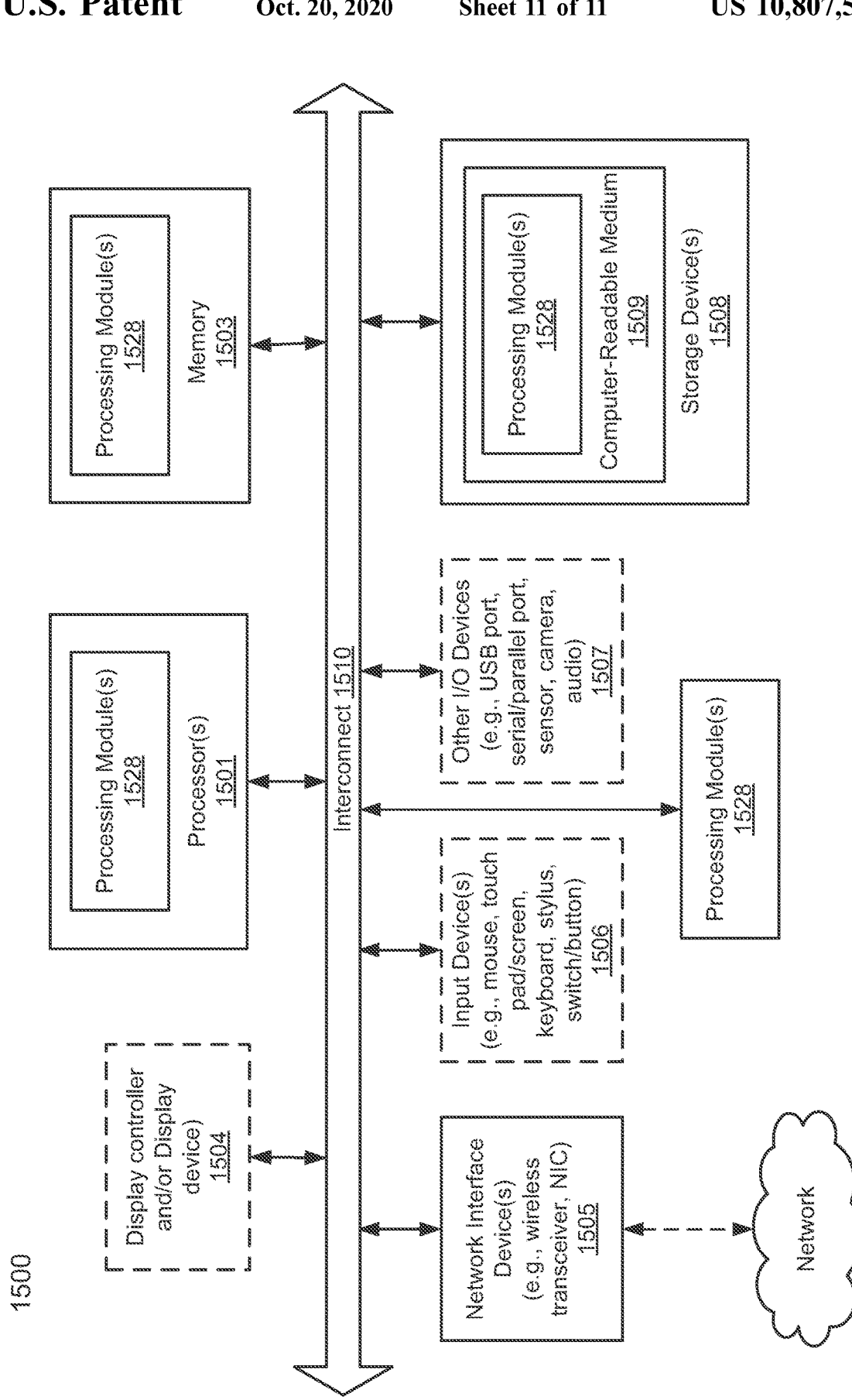
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, or routing module 307. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for path planning of autonomous driving vehicles, the method comprising:
   in response to a route for routing an autonomous driving vehicle (ADV) from a source location to a target location, analyzing the route to identify a list of one or more driving scenarios along the route that match one or more predefined driving scenarios, including a turning scenario;
   segmenting the route into a plurality of route segments based on the driving scenarios, at least one of the route segments corresponding to one of the identified driving scenarios; and
   generating a path based on the route segments for driving an autonomous driving vehicle (ADV) from the source location to the target location, the path having a plurality of path segments corresponding to the route segments, wherein generating the path includes identifying the one or more route segments that match or do not match any one of the predefined driving scenarios, and, for each of the route segments that matches one of the predefined driving scenarios,
   identifying a preconfigured path segment based on one or more driving parameters associated with the route segment; and
   using the identified preconfigured path segment in place of a path segment that corresponds to the matched route segment, wherein when the route segment matches the turning scenario, the preconfigured path segment is identified based on a starting location of the ADV and a curvature of the route segment.

2. The method of claim 1, wherein the one or more predefined driving scenarios further include a driving straight scenario, or a lane changing scenario.

3. The method of claim 2, wherein when the route segment matches the straight driving scenario, the preconfigured path segment is identified based on a starting location, end location, and lane width.

4. The method of claim 2, wherein when the route segment matches the lane changing scenario, the preconfigured path segment is identified based on a starting location, an end location, speed, and a distance between a source lane and a target lane.

5. The method of claim 1, further comprising:
determining a first driving scenario corresponding to a first route segment;
identifying a first scenario to path (scenario/path) table corresponding to the first driving scenario; and
obtaining a first preconfigured path segment from the first scenario/path table to replace a first path segment of the path corresponding to the first route segment.

6. The method of claim 5, wherein obtaining the first preconfigured path segment from the identified scenario/path table comprises:
determining a first starting location of the first path segment;
searching in the first scenario/path table based on first starting location of the first path segment to locate an entry that approximately matches the first starting location; and
obtaining a first preconfigured path segment from the matching entry of the first scenario/path table.

7. The method of claim 6, wherein the first scenario/path table is one of a plurality of scenario/path tables, wherein each scenario/path table corresponds to one of a plurality of predefined driving scenarios.

8. The method of claim 6, wherein the first scenario/path table comprises a plurality of mapping entries, each mapping entry mapping a particular starting location to a particular preconfigured path.

9. A non-transitory machine-readable medium having instructions stored therein, which when executed by a processor, cause the processor to perform operations, the operations comprising:
in response to a route for routing an autonomous driving vehicle (ADV) from a source location to a target location, analyzing the route to identify a list of one or more driving scenarios along the route that match one or more predefined driving scenarios, including a turning scenario;
segmenting the route into a plurality of route segments based on the driving scenarios, at least one of the route segments corresponding to one of the identified driving scenarios; and
generating a path based on the route segments for driving an autonomous driving vehicle (ADV) from the source location to the target location, the path having a plurality of path segments corresponding to the route segments, wherein generating the path includes identifying the one or more route segments that match or do not match any one of the predefined driving scenarios, and, for each of the route segments that matches one of the predefined driving scenarios,
identifying a preconfigured path segment based on one or more driving parameters associated with the route segment; and
using the identified preconfigured path segment in place of a path segment that corresponds to the matched route segment, wherein when the matched route segment is identified as the turning scenario, the preconfigured path segment is identified based on a starting location of the ADV and a curvature of the segment.

10. The machine-readable medium of claim 9, wherein the one or more predefined driving scenarios further include a driving straight scenario, or a lane changing scenario.

11. The machine-readable medium of claim 9, wherein the operations further comprise:
determining a first driving scenario corresponding to a first route segment;
identifying a first scenario to path (scenario/path) table corresponding to the first driving scenario; and
obtaining a first preconfigured path segment from the first scenario/path table to replace a first path segment of the path corresponding to the first route segment.

12. The machine-readable medium of claim 11, wherein obtaining the first preconfigured path segment from the identified scenario/path table comprises:
determining a first starting location of the first path segment;
searching in the first scenario/path table based on first starting location of the first path segment to locate an entry that approximately matches the first starting location; and
obtaining a first preconfigured path segment from the matching entry of the first scenario/path table.

13. The machine-readable medium of claim 12, wherein the first scenario/path table comprises a plurality of mapping entries, each mapping entry mapping a particular starting location to a particular preconfigured path.

14. The machine-readable medium of claim 12, wherein the first scenario/path table is one of a plurality of scenario/path tables, wherein each scenario/path table corresponds to one of a plurality of predefined driving scenarios.

15. A data processing system, comprising:
a processor; and
a memory coupled to the processor to store instructions, which when executed by the processor, cause the processor to perform operations, the operations including
in response to a route for routing an autonomous driving vehicle (ADV) from a source location to a target location, analyzing the route to identify a list of one or more driving scenarios along the route that match one or more predefined driving scenarios, including a turning scenario,
segmenting the route into a plurality of route segments based on the driving scenarios, at least one of the route segments corresponding to one of the identified driving scenarios, and
generating a path based on the route segments for driving an autonomous driving vehicle (ADV) from the source location to the target location, the path having a plurality of path segments corresponding to the route segments, wherein generating the path includes identifying the one or more route segments that match or do not match any one of the predefined driving scenarios, and, for each of the route segments that matches one of the predefined driving scenarios,
identifying a preconfigured path segment based on one or more driving parameters associated with the route segment; and
using the identified preconfigured path segment in place of a path segment that corresponds to the matched route segment, wherein when the route segment matches the turning scenario, the preconfigured path segment is identified based on a starting location of the ADV and a curvature of the route segment.

16. The system of claim 15, wherein the operations further comprise:
determining a first driving scenario corresponding to a first route segment;
identifying a first scenario to path (scenario/path) table corresponding to the first driving scenario; and obtaining a first preconfigured path segment from the first scenario/path table to replace a first path segment of the path corresponding to the first route segment.

17. The system of claim 16, wherein obtaining the first preconfigured path segment from the identified scenario/path table comprises:

determining a first starting location of the first path segment;

searching in the first scenario/path table based on first starting location of the first path segment to locate an entry that approximately matches the first starting location; and obtaining a first preconfigured path segment from the matching entry of the first scenario/path table.

18. The system of claim 15, wherein the one or more predefined driving scenarios further include a driving straight scenario, or a lane changing scenario.

* * * * *